US006145918A

United States Patent [19]

Wilbanks, II

[11] Patent Number: 6,145,918

[45] Date of Patent: Nov. 14, 2000

[54] ANTI-PINCH DOOR LOCK

[75] Inventor: Joseph Allen Wilbanks, II, Hermitage, Tenn.

[73] Assignee: Meritor Light Vehicle Systems, LLC, Troy, Mich.

[21] Appl. No.: 09/415,411

[22] Filed: Oct. 8, 1999

[51] Int. Cl.[7] ........ B60J 1/08

[52] U.S. Cl. ........ 296/146.1; 49/26

[58] Field of Search ........ 296/146.4, 146.1, 296/223; 292/216, DIG. 43, 46, 65; 116/28 R, 45, 60; 49/25, 26, 27, 28

[56] References Cited

U.S. PATENT DOCUMENTS

| | | | |
|---|---|---|---|
| 3,231,880 | 1/1966 | Stein . | |
| 4,458,446 | 7/1984 | Mochida et al. | 49/28 |
| 4,835,449 | 5/1989 | Huehn | 318/282 |
| 5,074,073 | 12/1991 | Zwebner | 49/26 |
| 5,167,296 | 12/1992 | Schreier et al. | 180/281 |
| 5,602,526 | 2/1997 | Read | 340/457 |
| 5,864,214 | 1/1999 | Brodsky | 318/282 |
| 5,941,598 | 8/1999 | Cave et al. | 296/213 |
| 5,955,854 | 10/1999 | Zhang et al. | 318/480 |
| 5,963,127 | 10/1999 | Lang et al. | 340/436 |
| 6,005,958 | 12/1999 | Farmer et al. | 382/103 |
| 6,012,008 | 1/2000 | Scully | 701/45 |
| 6,014,601 | 1/2000 | Gustafson | 701/45 |

*Primary Examiner*—Dennis H. Pedder
*Assistant Examiner*—Mickki Murray
*Attorney, Agent, or Firm*—Carlson, Gaskey & Olds

[57] ABSTRACT

A method and apparatus for preventing the capturing and pinching of a user within the path of a vehicle door includes a sensor for determining the presence of an obstruction when the door is being closed. When an obstruction is detected, a mechanism is actuated which prevents movement of the door to its fully latched position. In this way, any resultant pinching is minimized.

15 Claims, 2 Drawing Sheets

ANTI-PINCH DOOR LOCK

BACKGROUND OF THE INVENTION

This invention relates to a method and apparatus for preventing the capture of an object in the path of a moving door, and subsequent latching of the door.

Vehicle doors typically include a latch mechanism which holds the door at a latched position when the door is closed. In one known mechanism, a claw pivots between a latched and unlatched position. An element on the vehicle frame drives the claw to the latched position as the door is closed into the frame.

While the standard structure for latching vehicle doors is successful in securely holding the door, some improvements would be desirable. In particular, an obstruction, such as the arm or fingers of a person, may sometimes be in the path of the door when the door is closed. When such an obstruction is found, the door is sometimes closed on this person, "pinching" an arm or finger.

It would be desirable to prevent or at least minimize the amount of pinching to the user upon such occurrences.

SUMMARY OF THE INVENTION

In a disclosed embodiment of this invention, a sensor is provided on the door which seeks to detect an obstruction in the closing path of the door. If an obstruction is detected, then a mechanism is actuated which prevents the door from latching, and thus minimizes pinching.

In one embodiment, the sensor is a laser which provides a "laser curtain" in the path of the door sensing the presence of an obstruction. The laser curtain sends out a signal, and receives reflected signals. The reflected signals should come from the frame, and a control has an indication of whether a reflective signal is from the vehicle frame, or is from an obstruction which is closer to the door than the vehicle frame. The presence of this obstruction can then be used to indicate the potential need for stopping latching of the door.

In one preferred embodiment, when an obstruction is identified a mechanism is actuated which prevents actuation of the latch mechanism to latch the door to the door frame. In one embodiment, this mechanism may drive the claw, to a position where it will no longer allow an element from the frame to move to the latched position. In this way, the door frame is stopped inches from the latched position, and any pinching of the person in the path of the door will be minimized.

In a second embodiment, a separate mechanism moves into the path of the element, again blocking movement of the claw to its latched position.

With either embodiment, a signal, such as a warning light, sound, etc. may also be actuated.

While one particular type of latch is disclosed, it should be understood that the present invention would extend to many types of door latch mechanisms, and also to other mechanisms for blocking, closing and latching of the door.

These and other features of the present invention can be best understood from the following specification and drawings, the following of which is a brief description.

DETAILED DESCRIPTION OF A PREFERRED EMBODIMENT

Figure 1:
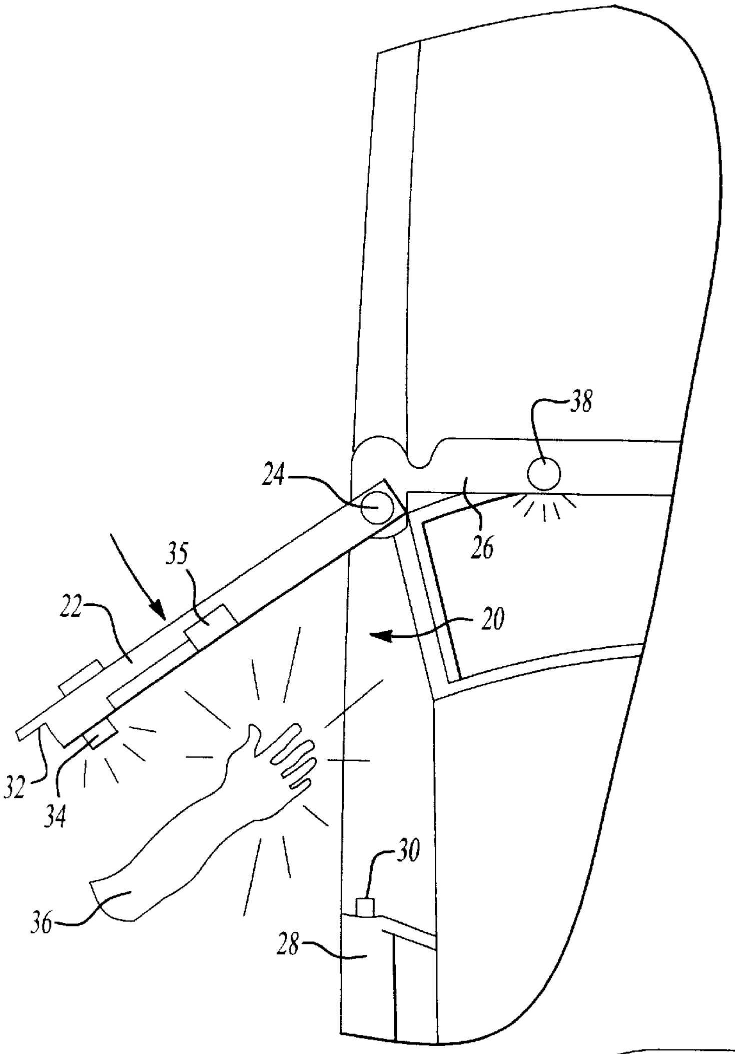
FIG. 1 is a schematic view of a vehicle door and frame.

A door assembly 20 is illustrated in FIG. 1 for blocking latching of a vehicle door 22 which is hinged at 24 to a front portion of a vehicle frame 26. As known, the door closes relative to a rear portion of the frame 28. A latch element 30 is typically placed on the frame 28, and a door latch mechanism 32 is typically found in the inner edge of the door 22.

The prior art at times resulted in a person having an arm or finger pinched within the door edge when the door was closed. The present invention is directed to preventing such pinching, or at least minimizing the harm from any such pinching. In particular, a sensor 34, which is preferably a laser curtain, looks inwardly from the door edge toward the door frame 28 as the door 22 is closed. A movement sensor and control 35 is preferably incorporated into the element 34 to determine when the door is moving. Alternatively, the laser could be activated whenever the door is opened. A sensor could easily be designed to determine if the door is opened. The control for the sensor 34, actuates the sensor 34 when the door is open or moving. The sensor 34 includes a transmitter, and a receiver. The transmitter and receiver may be similar to those typically used to provide a laser curtain in various industrial applications. That is the laser transmitter and reciever are known and form no portion of this invention. The sensor detects reflected waves, and the control 35 is programmed to have an expectation of the distance the reflective wave should travel prior to reflection based upon the distance between the door 22 and the frame 28. An obstruction results in a reflection from a closer distance. Thus, the presence of an object or obstruction, such as an arm 36, would be detected by the sensor 34. The control 35 then detects the presence of the arm 36. Upon detection, control 35 initially actuates a warning light, alarm, etc. 38. This would provide some indication to the person 36 in the door path that the door is closing. A person closing the door during this time may also be given a warning to stop the closing due to the presence of the obstruction 36. Of course, the invention would detect any obstruction, not just a user's arm. A non-human obstruction might also damage the door, and thus the detection of the obstruction is also valuable.

The present invention preferably blocks latching of the door when an obstruction is detected. Various types of mechanisms may be utilized to prevent such latching. One particular location for the prevention mechanism would be at the latch 32 itself.

Figure 2:
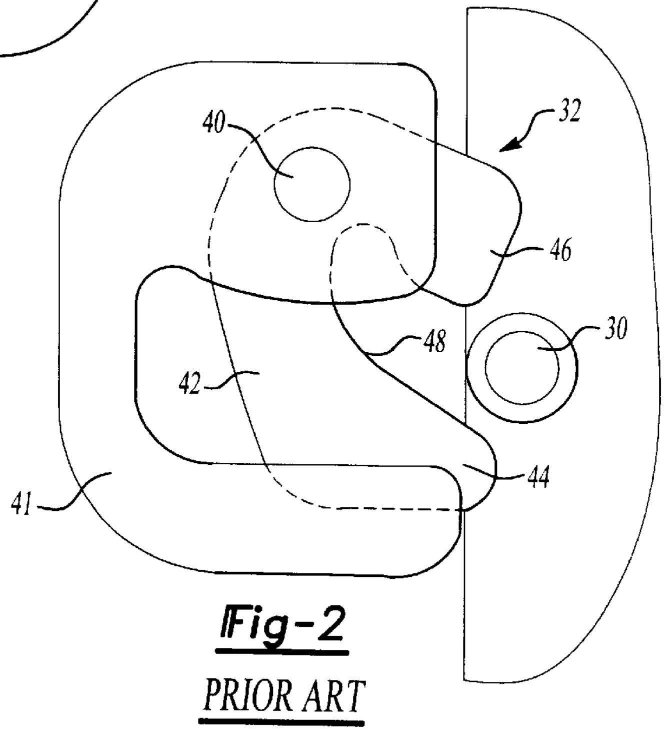
Fig-2 PRIOR ART
FIG. 2 shows an existing latch mechanism.

FIG. 2 shows one known prior art latch 32. As shown, a pivot pin 40 mounted in a fixed frame portion 41 carries a pivoting claw 42. Although not shown, the claw 42 is preferably biased to one of two positions, at which the door is either latched or unlatched. The claw moves with movement of the door handle, as known to move to the unlatching position.

A lower portion 44 of the claw is spaced from an upper portion 46 about the pivot point 40. A channel 48 between the upper and lower portions 44 and 46 selectively receives the lock element 30 from the door frame 28. As known, as the door approaches the frame the element 30 strikes the lower portion 44 causing the claw 42 to pivot to its latched position. At the latched position, the portion 46 is received to the right of the element 30 in the orientation as shown in FIG. 2. In this location, the door is latched.

If the user's arm 36 was in the path of the door when the door has moved to this latched position, the pinching described above would have occurred.

Figure 3:
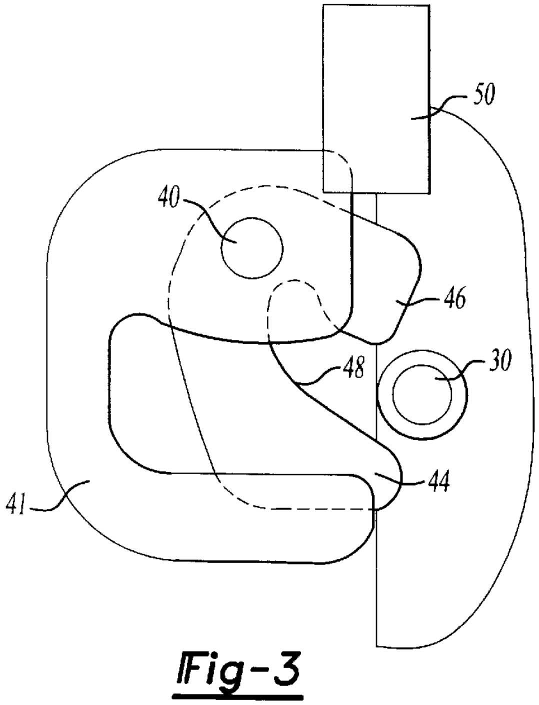
FIG. 3 shows the latch mechanism of FIG. 2 in the unlatched position.

A blocking mechanism 50 is illustrated in FIG. 3 is intended to prevent the pinching. As mentioned above, the sensor 35 is active to determine whether the door is open or in motion. If an obstruction is not detected, then the mechanism 50 is at the illustrated position where it does not block movement to the latched position. Element 30 moves claw 42 to the latched position.

Figure 4:
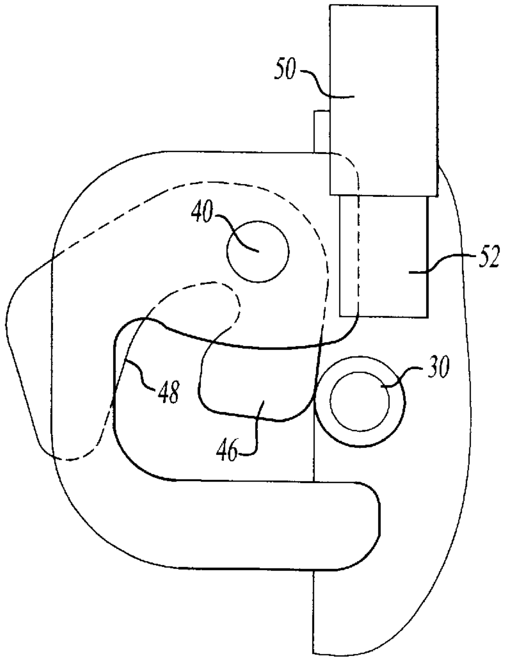
FIG. 4 shows the latch mechanism of FIG. 3 in a blocking position.

However, should an obstruction be detected, then the mechanism 50 is actuated by driving pin 52 outwardly against the upper end 46 of the claw. This causes the claw to pivot to a position which approximates its latched position without the element 30 as shown in FIG. 4. In the latched position, element 30 can no longer move into the recess 48. Thus, the door is stopped from being latched inches from the fully latched position. In this way, the person 36 or other obstruction, will not be pinched, or at least not pinched as hard as with the prior art.

Figure 5:
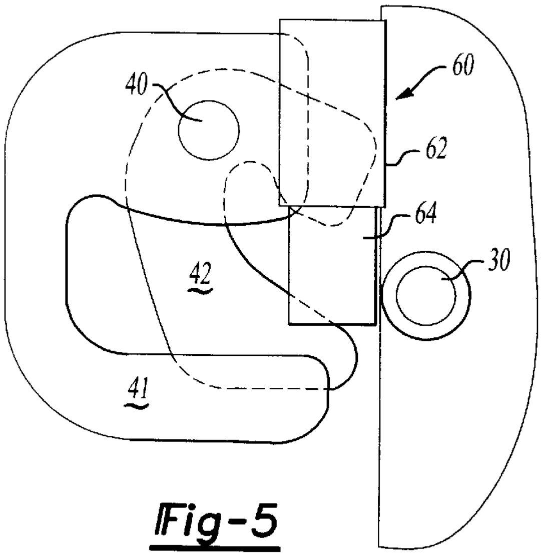
FIG. 5 shows a second embodiment mechanism in a blocking position.

A second embodiment mechanism 60 is illustrated in FIG. 5. In second embodiment 60, a mechanism 62 has a pin 64 that operates much like the pin 52 in the FIGS. 3 and 4 embodiment. However, in this embodiment, the pin 64 itself blocks the path of the element 30, rather than driving the claw 42. Again, this prevents the movement of the door to its fully latched position, and provides inches of clearance.

Although a particular latch mechanism has been disclosed, it should be understood that other blocking mechanisms come within the scope of the invention. Moreover, the blocking mechanism may be at locations other than in the latch mechanism.

Although the disclosed blocking mechanisms block movement to the fully latched position, other mechanisms which simply block movement to a fully closed position may also be utilized. Within the context of this application, the term "closed" position of the door will refer to the position at which the door is received within the doorframe, and latched. Broadly, the present invention would extend to any mechanism which prevents movement to this fully closed position.

A worker in this art would recognize that many modifications of this basic invention would come within the scope of this invention. For that reason, the following claims should be studied to determine the true scope and content of this invention.

What is claimed is:

1. A method of protecting an object in the path of the door, comprising the steps of:

1) providing a sensor for determining the presence of an object in the path of a door, and providing an apparatus which is selectively actuated to prevent complete closing of said door;

2) sensing the presence of an object in the path of said vehicle door; and 3) preventing complete closing of said door when an object is detected at step 2, said door including a latch which is selectively driven to lock by an element on a vehicle frame, and preventing movement of said lock latch to a latched position upon the detection of an object in step 2.

2. A method as set forth in claim 1, wherein said element is an element extending outwardly of a vehicle frame contacts a claw on a door, and said claw pivoting to a latched position to capture said element, said preventing of step 3) including stopping movement of said element to said latched position.

3. A method as set forth in claim 2, wherein said claw is moved to a latched position prior to said element contacting said claw.

4. A method as set forth in claim 3, wherein a separate blocking member moves into the path of said element, preventing said element from contacting said latch and moving said latch to said latched position.

5. A method is set forth in claim 1, wherein said sensing of step 2) occurs when the door is moving.

6. A method is set forth in claim 1, wherein the sensing of step 2) occurs whenever the door is open.

7. A method as set forth in claim 1, wherein a warning signal is actuated when an obstruction is detected.

8. A door anti-pinch apparatus comprising:

a sensor for sensing an obstruction in the path of a vehicle door;

a structure for preventing said vehicle door from being fully closed when said sensor determines that an object is in the path of said door; and a latching mechanism latching said vehicle door within a frame of a vehicle and said structure preventing latching of said latching mechanism upon the detection of an object, said latch including a claw member which pivots to capture a locking element on a vehicle frame, said claw member being prevented from pivoting to a latch position by said structure upon the detection of an obstruction.

9. An apparatus as set forth in claim 8, wherein a mechanism drives said claw to a blocking position when an obstruction is detected, and said element on said frame not being able to drive said claw to pivot to its latched position.

10. An apparatus as set forth in claim 8, wherein a separate mechanism is driven into the path of said element such that said element cannot drive said claw to a latched position upon the detection of an obstruction.

11. An apparatus as set forth in claim 8, wherein said sensing mechanism is an element which sends a signal outwardly into the path of said door and receives the reflected signals to determine the presence of an obstruction.

12. An apparatus as set forth in claim 11, wherein said sensor is a laser.

13. An apparatus as set forth in claim 8 wherein a warning signal is provided which is actuated upon the detection of an obstruction.

14. An apparatus as set forth in claim 8, wherein a control senses when a vehicle door is opened, and actuates said sensor when said vehicle door is open.

15. An apparatus as set forth in claim 8, wherein a control detects when said vehicle door is moving, and actuates said sensor when said vehicle door is moving to a closed position.

* * * * *